3,309,346
POLYMERIZATION PROCESS EMPLOYING CATALYST CONTAINING METAL COMPOUNDS
Harry W. Coover, Jr., and Marvin A. McCall, Kingsport, Tenn., assignors to Eastman Kodak Company, Rochester, N.Y., a corporation of New Jersey
No Drawing. Filed Oct. 10, 1963, Ser. No. 315,350
14 Claims. (Cl. 260—93.7)

This invention relates to a new and improved process for the polymerization of olefinic hydrocarbons. More particularly, this invention relates to a novel catalyst combination for preparing high molecular weight, solid polyolefins, such as polypropylene of high density and crystallinity. In a specific aspect, this invention relates to the preparation of polymers of propylene and its higher homologs using a particular catalyst combination which has unexpected catalytic activity and which results in polymeric products characterized by high crystallinity.

Polyethylene has been prepared by high pressure procedures to produce relatively flexible polymers having a rather high degree of chain branching and a density considerably lower than the theoretical density. Thus, pressures of the order of 500 atmospheres and higher and usually of the order of 1,000 to 1,500 atmospheres are commonly employed in such procedures. It has been found that more dense polyethylene can be produced with certain catalyst combinations to give polymers which have relatively little chain branching and a high degree of crystallinity. The exact reason why certain catalyst combinations give these polymers of high density and high crystallinity is not fully understood. Furthermore, the activity of the catalysts ordinarily depends upon certain specific catalyst combinations and the results are ordinarily highly unpredictable since relatively minor changes in the catalyst combination often lead to liquid polymers rather than the desired solid polymers. In addition, the same catalysts which form solid polymers from ethylene will often form only liquid polymers from other α-monoolefins such as propylene.

Among the catalysts that have been employed to polymerize olefinic hydrocarbons to solid crystalline polymers are combinations that include organo-aluminum compounds, such as trialkyl aluminum compounds in conjunction with certain inorganic halides. Thus, triethyl aluminum in conjunction with titanium tri- or tetrachloride catalyzes a polymerization reaction for the production of crystalline polymers from olefinic hydrocarbons. However, such prior art two component catalyst systems give large amounts of rubber, oils and low molecular weight non-crystalline mtaerials. These materials are usually removed from the crystalline polymers by extraction in order to obtain a product having good physical properties in the form of fiber, sheeting, molded articles and the like. Such extraction is both troublesome and expensive. It would be desirable, therefore, to provide a catalytic polymerization process for olefinic hydrocarbons which will give a highly crystalline polymer acceptance for most commercial applications without extraction.

Accordingly, it is an object of this invention to provide an improved process for the polymerization of olefinic hydrocarbons to form solid, high density crystalline products.

It is another object of this invention to provide an improved process for the polymerization of propylene and higher α-monoolefinic hydrocarbons to produce solid, high density, crystalline products.

It is another object of this invention to provide novel catalyst combinations which have unexpected catalytic activity for the polymerization of olefinic hydrocarbons to form crystalline high density polymers.

Other objects of this invention will be readily apparent from the detailed disclosure.

The above and other objects are accomplished by means of this invention wherein olefinic hydrocarbons containing at least three carbon atoms, either singly or in admixture, are readily polymerized to high molecular weight, solid crystalline polymers by effecting the polymerization in the presence of a catalyst composition comprising (1) a compound of a transition metal from Group IVB–VIB of the Periodic Table and (2) a compound having the formula:

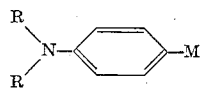

where each R is a lower alkyl radical, and M is an alkali metal, $AlR'_2$ or $Li \cdot AlR'_3$ where each R' is an alkyl radical, desirably containing up to 10 carbon atoms and preferably 1–8 carbon atoms. Suitable R' radicals include, therefore, methyl, ethyl, propyl, butyl, octyl, decyl and the like.

The transition metal compounds of the above catalyst system are those generally employed in the polymerization of olefinic hydrocarbons and comprise the alkoxides, alkoxyhalides, and halides, including oxyhalides, such as iodides, chlorides, or bromides of Group IVB–VIB metals such as titanium, vanadium, zirconium, chromium and molybdenum. Transition metal compounds in which the metals are at their maximum valence can be used, or if desired, a reduced valency form of the compound can be employed. It is preferred to use the titanium chlorides which may be in the form of titanium tetrachloride, titanium trichloride and titanium dichloride. Examples of other metal halides, alkoxides and alkoxyhalides, preferably containing lower alkoxy groups, that can be employed are titanium tetrabromide, titanium tribromide, zirconium tetrachloride, zirconium tribromide, vanadium trichloride, molybdenum pentachloride, chromium tribromide, titanium tetrabutoxide, vanadium oxychloride, vanadium triethoxide, titanium tetraoctoxide, titanium oxychloride, dichlorotitanium dibutoxide, and the like. The Periodic Table referred to herein can be found in "Lange's Handbook of Chemistry," 8th edition (1952) at pages 56 and 57.

The catalytic mixtures employed in the practice of this invention contain one component having the formula:

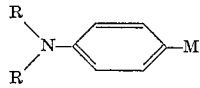

where R and M are as defined hereinbefore. Suitable alkali metals include sodium, potassium, lithium and the like, while the lower alkyl radicals, R, are exemplified by methyl, ethyl, propyl, butyl and the like. Included within the scope of the invention, therefore, are such compounds as p-dimethylaminophenylaluminumdiethyl, p-dimethylaminophenyllithium, p-diethylaminophenyllithium, p-diethylaminophenylaluminumdiisobutyl, p-dimethylaminophenyllithium aluminumtriethyl complex, p-dimethylaminophenylsodium, p-dibutylaminophenyllithium, p-dibutylaminophenyllithium-aluminumtridecyl complex and the like. The dialkylaminophenyl alkali metal compounds such as p-dimethylaminophenyllithium can be prepared using the procedure of Gilman et al. described in J. Am. Chem. Soc., 62, 1847 (1940). A suitable procedure involves the reaction of a p-halodialkylaniline with an alkali metal alkyl at slightly elevated temperatures for a period of up to about 20 hours. The reaction is generally carried out in the presence of an inert solvent, or mixture of solvents, such as benzene, xylene, hexane, heptane, and the like. The preferred halogen compound is one containing bromine although those containing chlorine or iodine give satisfactory results. The p-dialkylaminophenyl alkali metal compounds can be reacted, desirably in equimolar amounts, with an aluminum alkyl compound having the formula AlR'$_3$ or AlR'$_2$X where each R' is an alkyl radical such as methyl, ethyl, propyl, hexyl, octyl, decyl or the like and X is a halogen such as chlorine, bromine or iodine to obtain the corresponding aluminum alkyl containing compound or complex. This latter reaction is carried out in a solvent, or mixture of solvents, at temperatures which are generally no more than about 50° C.

It is surprising that the two component catalysts of this invention are effective to form solid, highly crystalline polymers since most prior art two component catalysts, and three component catalyst systems such as dialkylphenylamines, non-transition metal containing components such as lithium metal and transition metal compounds such as titanium trichloride generally give polymer containing about 20–25%, by weight, of an extractable amorphous fraction, as shown by the following examples.

The invention process is generally carried out in liquid phase in an organic liquid, preferably in a liquid hydrocarbon vehicle, but the process can be carried out in the absence of such vehicle. The process proceeds with excellent results over a temperature range of from about 50° C. to about 150° C. although it is preferred to operate within the range of from about 50° C. to about 90° C. Likewise, the reaction pressures can be varied widely from about atmospheric pressure to very high pressures of the order of 20,000 p.s.i. or higher. A particular advantage of the invention is that pressures of the order of 30 to 1000 p.s.i. give excellent results, and it is not necessary to employ extremely high pressures which have often been necessary heretofore. The liquid vehicle employed is desirably one which serves as an inert liquid reaction medium.

The invention is of particular importance in the preparation of highly crystalline polypropylene, the polybutenes and polystyrene although it can be used for polymerizing other olefinic hydrocarbons, preferably aliphatic α-monoolefinic hydrocarbons, containing at least 3 carbon atoms and generally no more than about 12 carbon atoms. Other suitable olefinic hydrocarbons, branched or unbranched, include pentene, hexene, heptene, decene, 3-methyl-1-butene, 4-methyl-1-pentene, 3,5-dimethyl-1-hexene, allyl benzene, allylcyclopentane and the like.

The process of the invention readily results in solid polymers having molecular weights greater than 1000 and usually greater than 10,000. Furthermore, polymers having molecular weights of as much as 1,000,000 or higher can be readily prepared, if desired. These polymers will exhibit crystallinities in excess of 85%, generally in excess of 90%, as shown by extraction with a suitable solvent such as hexane, heptane, diethyl ether or the like which will remove the noncrystalline amorphous fractions.

The novel catalysts described above are quite useful for polymerizing propylene to form a crystalline, high density polymer. The polypropylene produced generally has a softening point above 155° C. and a density of 0.90 and higher. Usually the density of the polypropylene is of the order of 0.91 to 0.92.

The polymers prepared in accordance with this invention can be molded or extruded and can be used to form plates, sheets, films or a variety of molded objects which exhibit a higher degree of stiffness than do the corresponding polymers prepared using high pressure processes. The products can be extruded in the form of pipe or tubing of excellent rigidity and can be injection molded into a great variety of articles. The polymers can also be cold drawn into ribbons, bands, fibers or filaments of high elasticity and rigidity. Fibers of high strength can be spun from the molten polymers obtained according to this process.

The limiting factor in the temperature of the process appears to be the decomposition temperature of the catalyst. Ordinarily, temperatures from 50° C. to 90° C. are employed, although temperatures as high as 150° C. or as low as 0° C. can be employed if desired. Usually, it is not desirable or economical to effect the polymerization at temperatures below 50° C., and the process can be readily controlled at temperatures not substantially above room temperature which is an advantage from the standpoint of commercial processing. The pressure employed is usually only sufficient to maintain the reaction mixture in liquid form during the polymerization, although higher pressures can be used if desired. The pressure is ordinarily achieved by pressing the system with the monomer whereby additional monomer dissolves in the reaction vehicle as the polymerization progresses.

The polymerization embodying the invention can be carried out batchwise or in a continuous flowing stream process. The continuous processes are preferred for economic reasons, and particularly good results are obtained using continuous processes wherein a polymerization mixture of constant composition is continuously and progessively introduced into the polymerization zone and the mixture resulting from the polymerization is continuously and progressively withdrawn from the polymerization zone at an equivalent rate, whereby the relative concentration of the various components in the polymerization zone remains substantially unchanged during the process. This results in formation of polymers of extremely uniform molecular weight distribution over a relatively narrow range. Such uniform polymers possess distinct advantages since they do not contain any substantial amount of the low molecular weight or high molecular weight fractions which are ordinarily found in polymers prepared by batch reactions.

In the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 30 to 1000 p.s.i. obtained by pressuring the system with the monomer being polymerized. The amount of vehicle employed can be varied over rather wide limits with relation to the monomer and catalyst mixture. Best results are obtained using a concentration of catalyst of from about 0.1% to about 2% by weight based on the weight of the vehicle. The concentration of the monomer in the vehicle will vary rather widely depending depending upon the reaction conditions and will usually range from about 2 to about 50% by weight. For a solution type of process it is preferred to use a concentration from about 2 to about 10% by weight based on the weight of the vehicle, and for a slurry type of process higher concentrations, for example, up to 40% and higher are preferred. Higher concentrations of monomer ordinarily increase the rate of polymerization, but concentrations above 5 to 10% by weight in a solution process are ordinarily less desirable because the polymer dissolved in the reaction medium results in a very viscous solution.

The molar ratio of component (2) to transition metal compound in our catalyst is generally within the range of about 0.1:1 to about 12:1, preferably in the range of 0.5:1 to about 6:1, but it will be understood that higher and lower molar ratios are within the scope of this invention. The polymerization time can be varied as desired and will usually be of the order of from 30 minutes to several hours in batch processes. Contact times of from 1 to 4 hours are commonly employed in autoclave type reactions. When a continuous process is employed, the contact time in the polymerization zone can also be regulated as desired, and in some cases it is not necessary to employ reaction or contact times much beyond one-half to one hour since a cyclic system can be employed by precipitation of the polymer and return of the vehicle and unused catalyst to the charging zone wherein the catalyst can be replenished and additional monomer introduced.

The organic vehicle, when employed, can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene xylene or the like, or a halogenated aromatic compound such as chlorobenzene, chloronaphthalene or othodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzene, mono and dialkyl naphthalenes, n-pentane, n-octane, isooctane, methyl cyclohexane, or any of the other well known inert liquid hydrocarbons. The diluents employed in practicing this invention can be advantageously purified prior to use in the polymerization reaction by contacting the diluent, for example, in a distillation procedure or otherwise, with the polymerization catalyst to remove undesirable trace impurities. Also, prior to such purification of the diluent the catalyst can be contacted advantageously with polymerizable α-monoolefin.

The polymerization ordinarily is accomplished by merely admixing the components of the polymerization mixture, and no additional heat is necessary unless it is desired to effect the polymerization at an elevated temperature in order to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

The invention is illustrated by the following examples of certain preferred embodiments thereof, although it will be understood that the invention is not limited thereby unless otherwise specifically indicated.

Example 1

A reaction mixture consisting of 20 g. (0.1 mole) of p-bromodimethylaniline in 50 cc. of dry benzene and 0.1 mole of n-butyl lithium (15% conc.) in a mixture of hexane and heptane is stirred at approximately 40° C. for 15 hrs. The solid product is filtered in a dry box, washed with petroleum ether and dried under vacuum. The yield is 10.6 g. solid M.P. 136–143° C. which gives a positive Gilman Color Test II [Gilman et al., J. Am. Chem. Soc., 62, 1847 (1940)]. The structure of the p-dimethylaminophenyllithium is confirmed by carbonation to p-dimethylaminobenzoic acid.

Example 2 p-Diethylaminophenyllithium is obtained when Example 1 is repeated using p-bromodiethylaniline in place of p-bromodimethylaniline.

Example 3 p-Dibutylaminophenyllithium is obtained when p-bromodibutylaniline is used instead of p-bromodimethylaniline in the procedure of Example 1.

Example 4 p-Dimethylaminophenylsodium is prepared by reacting p-bromodimethylaniline (0.05 mole) with n-butylsodium (0.05 mole) using the procedure of Example 1.

Example 5 p-Dimethylaminophenylaluminumdiethyl is obtained by reacting 5.10 g. (0.04 mole) of dimethylaminophenyllithium with 32.3 ml. of a 15% solution of diethylaluminum chloride (0.04 mole). The reaction is carried out by adding the solution containing the diethylaluminum chloride to the p-dimethylaminophenyllithium dispersed in 150 ml. of dry benzene under an atmosphere of nitrogen. The reaction mixture is stirred for about 15 hours and then filtered in a dry box. The solid, 1.7 g., is identified at lithium chloride and discarded. The filtrate (132 ml.) contains 0.062 g. of p-dimethylaminophenylaluminum diethyl per ml. of solution.

Example 6 p-Diethylaminophenylaluminumdiisobutyl is obtained by reacting diethylaminophenyllithium with diisobutylaluminum chloride in the same manner as described in Example 5.

Example 7 p-Dimethylaminophenyllithium-aluminumtriethyl complex is obtained by reacting 5.05 g. (0.039 mole) of p-dimethylaminophenyllithium suspended in 100 ml. dry benzene with 4.45 g. (0.039 mole) of triethylaluminum in 44.5 ml. of dry benzene solution. A 10° temperature rise is noted upon addition of the triethyl aluminum solution to the suspension of dimethylamonophenyllithium in benzene. The reaction is stirred for about 15 hours under nitrogen. The solution containing the product gives positive Gilman Color Tests I and II [Gilman et al., J. Am. Chem. Soc., 47, 2002 (1925) and Gilman et al., J. Am. Chem. Soc. 62, 1847 (1940)].

Example 8 p-Dibutylaminophenyllithium-aluminumtridecyl complex is obtained using the procedure described in Example 7 with p-dibutylaminophenyllithium and tridecylaluminum.

Example 9

The p-dialkylamonophenyl metal containing compounds are effective components in two component catalysts for the preparation of solid, highly crystalline polymers having a very low content of amorphous extractables. To illustrate, several polymerization runs using propylene are carried out as follows:

A 300 cc. stainless steel autoclave is charged with 100 cc. of dry mineral spirits, 0.46 g. of p-dialkylaminophenyl metal containing compound and 0.62 g. of titanium trichloride. The charging operation is carried out in a dry box. The autoclave is next charged with 100 cc. (51 g.) of liquid propylene, heated to 55° C. and the reaction run at 85° C. for 1 hr. All the propylene is converted to polymer which is extracted in a Soxhlet extractor at 100° C. for 8 hr. with n-butyl ether which removes noncrystalline polymer. The ether is evaporated and the extracted polymer is washed with ethanol, then with water and dried for about 15 hrs. in an oven at 50° C.

The results of these runs using the above procedure with the organometallic compounds of this invention or aluminum triethyl (a typical prior art organometallic catalyst component) with titanium trichloride or a three component catalyst consisting of diethylaminophenyl, lithium metal and titanium trichloride are set forth in the following table.

TABLE 1

| Run | Catalyst Component with Titanium Trichloride | Conversion, Percent | Percent Extractables | Inherent Viscosity (tetralin at 145° C.) |
|---|---|---|---|---|
| 1 | p-Dimethylaminophenyllithium | 100 | 5.4 | 4.0 |
| 2 | p-Diethylaminophenyllithium | 100 | 6.8 | 2.9 |
| 3 | p-Dibuthylaminophenyllithium | 100 | 5.2 | 3.9 |
| 4 | p-Dimethylaminophenylsodium | 100 | 5.6 | 3.7 |
| 5 | p-Dimethylaminophenylaluminumdiethyl | 100 | 6.5 | 2.6 |
| 6 | p-Diethylaminophenylaluminumdiisobutyl | 100 | 6.2 | 2.5 |
| 7 | p-Dimethylaminophenyllithium-aluminumtriethyl complex | 100 | 6.5 | 2.7 |
| 8 | p-Dibutylaminophenyllithium-aluminumtridecyl complex | 100 | 6.4 | 2.4 |
| 9 | Aluminum triethyl | 100 | 20 | 1.9 |
| 10 | Lithium metal, diethylphenyl amine (mole ratio 1:1) | 100 | 20 | 1.2 |

It can be seen from the above table that the catalysts of this invention are extremely effective in the formation of highly crystalline polymers which can be used directly in most commercial applications without troublesome and expensive extraction procedures.

Similar results are obtained when other olefinic hydrocarbons containing at least 3 carbon atoms are substituted in the above procedure for propylene. Such olefinic hydrocarbons are butene-1,4-methyl-1-pentene, hexene, octene, α-methyl styrene, vinyl cyclohexane, allyl cyclopentane, allyl benzene and the like.

The same excellent results are also obtained when transition metal compounds such as vanadium oxychloride, titanium oxychloride, titanium tetrachloride, zirconium tribromide, titanium tetrabutoxide, dimethoxy titanium dichloride, molybdenum pentachloride or chromium chloride are substituted for titanium trichloride in any of the above procedures.

*Example 10*

A catalyst mixture of p-dimethylaminophenylaluminumdiethyl and titanium trichloride is used according to the procedure of Example 9 with 200 ml. of 3-methylbutene and no added solvent. The conversion is 100% of polymer having an inherent viscosity in tetralin at 145° C. of 1.88 and containing 6.5% extractables in methyl isobutyl ketone.

*Example 11*

As already indicated, the novel catalysts of this invention can be used in the copolymerization of olefinic hydrocarbons containing at least 3 carbon atoms. To illustrate, the catalyst mixture of Example 10 is used in the procedure of Example 9 with dry heptane solvent and a monomer mixture containing a 50/50 mole ratio of 4 methyl-1-pentene and 3-methylbutene. The conversion is 91% of copolymer having an inherent viscosity in tetralin at 145° C. of 2.3 and a crystallinity of 94%, as shown by insolubility in boiling methyl isobutyl ketone.

*Example 12*

The procedure of Example 9 is repeated with a catalyst comprising dimethylaminophenyllithium (0.004 mole) and titanium trichloride (0.004 mole) with butadiene. The yield is 80% of polymer shown to be cis 1,4-polybutadiene by infrared.

Thus, by means of this invention, α-olefinic hydrocarbons, particularly α-monoolefins, such as propylene, are readily polymerized using a catalyst combination that has been found to have unexpected activity for producing highly crystalline polymer in excellent yields. The polymers thus obtained can be extruded, mechanically milled, cast or molded as desired. The polymers can be used as blending agents with the relatively more flexible high pressure polyethylenes to give any desired combination of properties. The polymers can also be blended with antioxidants, stabilizers, plasticizers, fillers, pigments, and the like, or mixed with other polymeric materials, waxes and the like. In general, the polymers embodying this invention can be treated in similar manner to those obtained by other processes.

From the detailed disclosure of this invention it is quite apparent that in this polymerization procedure a novel catalyst, not suggested in prior art polymerization procedures, is employed. As a result of the use of this novel catalyst it is possible to produce polymeric hydrocarbons, particularly polypropylene, having improved properties. For example, polypropylene prepared in the presence of catalyst combinations within the scope of this invention is substantially free of rubbery and oily polymers and thus it is not necessary to subject such polypropylene to extraction procedures in order to obtain a commercial product. Such polypropylene also has a very high stiffness as a result of the unexpectedly high crystallinity.

The novel catalysts defined above can be used to produce high molecular weight crystalline polymeric hydrocarbons. The molecular weight of the polymers can be varied over a wide range by introducing hydrogen to the polymerization reaction. Such hydrogen can be introduced separately or in admixture with the olefinic monomer. The polymers produced in accordance with this invention can be separated from polymerization catalyst by conventional procedures such as by washing with water or lower aliphatic alcohols such as methanol.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. In the polymerization of olefinic hydrocarbon containing at least 3 carbon atoms to form solid, crystalline polymer, the improvement which comprises catalyzing the polymerization with a catalyst mixture consisting essentially of (1) a compound of a transition metal from Group IVB–VIB of the Periodic Table and (2) a compound having the formula:

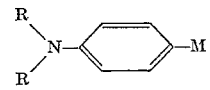

where each R is a lower alkyl radical and M is a member selected from the group consisting of an alkali metal, AlR′$_2$ and Li·AlR′$_3$, where each R′ is an alkyl radical.

2. The method according to claim 1 where (1) is titanium halide.

3. The method according to claim 1 where the olefinic hydrocarbon containing at least 3 carbon atoms is propylene and (1) is titanium trichloride.

4. In the polymerization of propylene to form solid, crystalline polymer, the improvement which comprises catalyzing the polymerization with a catalyst mixture consisting essentially of (1) titanium trichloride and (2) p-dimethylaminophenyllithium.

5. In the polymerization of propylene to form solid, crystalline polymer, the improvement which comprises catalyzing the polymerization with a catalyst mixture consisting essentially of (1) titanium trichloride and (2) p-diethylaminophenyllithium.

6. In the polymerization of propylene to form solid, crystalline polymer, the improvement which comprises catalyzing the polymerization with a catalyst mixture consisting essentially of (1) titanium trichloride and (2) p-dimethylaminophenyl-aluminumdiethyl.

7. In the polymerization of propylene to form solid, crystalline polymer, the improvement which comprises catalyzing the polymerization with a catalyst mixture consisting essentially of (1) titanium trichloride and (2) p-dimethylaminophenyl-lithium - aluminumtriethyl complex.

8. As a composition of matter, a polymerization catalyst consisting essentially of (1) a compound of a transition metal from Group IVB–VIB of the Periodic Table and (2) a compound having the formula:

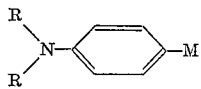

where each R is a lower alkyl radical and M is a member selected from the group consisting of an alkali metal, $AlR'_2$ and $Li \cdot AlR'_3$, where each R' is an alkyl radical.

9. As a composition of matter, the polymerization catalyst of claim 8 in which (1) is a titanium halide.

10. As a composition of matter, the polymerization catalyst of claim 8 in which (1) is a titanium trichloride.

11. As a composition of matter, a polymerization catalyst consisting essentially of (1) titanium trichloride and (2) p-dimethylaminophenyllithium.

12. As a composition of matter, a polymerization catalyst consisting essentially of (1) titanium trichloride and (2) p-diethylaminophenyllithium.

13. As a composition of matter, a polymerization catalyst consisting essentially of (1) titanium trichloride and (2) p-dimethylaminophenylaluminumdiethyl.

14. As a composition of matter, a polymerization catalyst consisting essentially of (1) titanium trichloride and (2) p - dimethylaminophenyllithium - aluminumtriethyl complex.

No references cited.

JOSEPH L. SCHOFER, *Primary Examiner.*

M. B. KURTZMAN, *Assistant Examiner.*